(12) United States Patent
Kim et al.

(10) Patent No.: US 11,550,963 B2
(45) Date of Patent: Jan. 10, 2023

(54) METHOD OF PROCESSING SECURE DATA AND ELECTRONIC DEVICE SUPPORTING THE SAME

(71) Applicant: Samsung Electronics Co., Ltd., Suwon-si (KR)

(72) Inventors: Bumhan Kim, Suwon-si (KR); Taehoon Kim, Suwon-si (KR); Jonghyeon Lee, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 17/224,454

(22) Filed: Apr. 7, 2021

(65) Prior Publication Data

US 2021/0319140 A1 Oct. 14, 2021

(30) Foreign Application Priority Data

Apr. 8, 2020 (KR) .......................... 10-2020-0042911

(51) Int. Cl.
*G06F 21/75* (2013.01)
*G06F 3/041* (2006.01)
(Continued)

(52) U.S. Cl.
CPC ............ *G06F 21/75* (2013.01); *G06F 3/0416* (2013.01); *G06F 21/32* (2013.01); *G06F 21/552* (2013.01); *G06F 2221/032* (2013.01)

(58) Field of Classification Search
CPC ........ G06F 21/75; G06F 3/0416; G06F 21/32; G06F 21/552; G06F 2221/032;
(Continued)

(56) References Cited

U.S. PATENT DOCUMENTS

| | | | |
|---|---|---|---|
| 6,118,428 A * | 9/2000 | Blackmon | G06F 9/451 715/781 |
| 7,734,933 B1 * | 6/2010 | Marek | G06F 21/85 713/193 |

(Continued)

FOREIGN PATENT DOCUMENTS

| | | |
|---|---|---|
| JP | 2005-504365 A | 2/2005 |
| KR | 10-2011-0081103 A | 7/2011 |

(Continued)

OTHER PUBLICATIONS

International Search Report dated Jul. 21, 2021, issued in an International Application No. PCT/KR2021/004362.

Primary Examiner — Darren B Schwartz
(74) Attorney, Agent, or Firm — Jefferson IP Law, LLP

(57) ABSTRACT

An electronic device is provided. The electronic device includes a communication circuit, a display, a memory including a first display driver, a processor functionally connected with the communication circuit, the display, and the memory, and a secure module which is physically separated from the processor, and includes a secure processor and a second display driver, and the secure processor is configured to: when secure data is received from an external server through the communication circuit, disable the first display driver and enable the second display driver, and output a user interface including a first object corresponding to the secure data to the display by using the enabled second display driver.

20 Claims, 12 Drawing Sheets

(51) Int. Cl.
*G06F 21/32* (2013.01)
*G06F 21/55* (2013.01)
*G06F 21/57* (2013.01)
*G06F 21/71* (2013.01)
*G06F 21/74* (2013.01)
*G06F 3/14* (2006.01)
*G06F 9/451* (2018.01)

(58) Field of Classification Search
CPC .... G06F 21/57; G06F 21/71; G06F 2221/031; G06F 21/74; G06F 3/14; G06F 9/451
See application file for complete search history.

(56) References Cited

U.S. PATENT DOCUMENTS

| | | | | |
|---|---|---|---|---|
| 8,233,000 | B1* | 7/2012 | Diard | G09G 5/363 345/503 |
| 8,274,518 | B2* | 9/2012 | Blythe | G06T 15/005 345/522 |
| 9,613,208 | B1* | 4/2017 | Paczkowski | G06F 21/64 |
| 10,284,530 | B1* | 5/2019 | Kuo | H04L 9/0897 |
| 10,904,007 | B2 | 1/2021 | Kim et al. | |
| 11,238,160 | B2* | 2/2022 | Kallenberg | G06F 12/1441 |
| 2003/0025678 | A1* | 2/2003 | Lee | G06F 3/0488 345/173 |
| 2004/0034764 | A1* | 2/2004 | Bulusu | G06F 9/4406 713/1 |
| 2004/0226041 | A1* | 11/2004 | Smith | G06F 3/14 345/531 |
| 2005/0086666 | A1* | 4/2005 | Nason | G06F 21/82 719/321 |
| 2007/0283175 | A1* | 12/2007 | Marinkovic | G06F 1/3218 713/320 |
| 2009/0153529 | A1* | 6/2009 | Masuda | G09G 3/20 345/204 |
| 2011/0145916 | A1* | 6/2011 | McKenzie | G06F 21/53 718/1 |
| 2012/0102333 | A1* | 4/2012 | Wong | G06F 21/60 713/189 |
| 2012/0311578 | A1* | 12/2012 | Hara | G06F 9/451 718/1 |
| 2013/0086292 | A1* | 4/2013 | Hsieh | G06F 3/14 710/302 |
| 2013/0181902 | A1* | 7/2013 | Hinckley | G06F 3/041 345/173 |
| 2014/0020114 | A1 | 1/2014 | Bhatia et al. | |
| 2014/0237609 | A1* | 8/2014 | Sharp | G06F 21/10 726/26 |
| 2015/0212631 | A1* | 7/2015 | Dave | G06F 3/03545 345/173 |
| 2015/0371050 | A1* | 12/2015 | Martini | G06F 21/83 726/26 |
| 2016/0035308 | A1* | 2/2016 | Ota | G09G 5/18 345/103 |
| 2016/0070932 | A1* | 3/2016 | Zimmer | G06F 21/53 713/192 |
| 2016/0094558 | A1* | 3/2016 | Lal | G06F 21/32 713/171 |
| 2017/0256304 | A1* | 9/2017 | Poornachandran | G06F 21/50 |
| 2017/0286701 | A1* | 10/2017 | Kim | G06F 9/545 |
| 2018/0019994 | A1 | 1/2018 | Chang et al. | |
| 2018/0024677 | A1* | 1/2018 | Kim | G06F 3/0412 345/173 |
| 2018/0234390 | A1* | 8/2018 | Camiel | H04L 63/1408 |
| 2018/0300469 | A1* | 10/2018 | Sarfraz | G06F 21/554 |
| 2019/0311175 | A1* | 10/2019 | Zhang | H04L 63/0861 |
| 2020/0012803 | A1* | 1/2020 | Mannan | G06F 21/6218 |
| 2020/0134160 | A1* | 4/2020 | Maaroufi | H04L 63/0892 |
| 2020/0159930 | A1* | 5/2020 | Venkateswaran | H04W 4/38 |
| 2020/0225296 | A1* | 7/2020 | Wang | G06F 3/041 |
| 2020/0293667 | A1 | 9/2020 | Kim et al. | |

FOREIGN PATENT DOCUMENTS

| | | |
|---|---|---|
| KR | 10-1259824 B1 | 4/2013 |
| KR | 10-2014-0018403 A | 2/2014 |
| KR | 10-2016-0015300 A | 2/2016 |
| KR | 101792862 B1 | 11/2017 |
| KR | 10-2018-0009275 A | 1/2018 |
| KR | 10-2020-0109111 A | 9/2020 |

* cited by examiner

METHOD OF PROCESSING SECURE DATA AND ELECTRONIC DEVICE SUPPORTING THE SAME

CROSS-REFERENCE TO RELATED APPLICATION(S)

This application is based on and claims priority under 35 U.S.C. § 119 of a Korean patent application number 10-2020-0042911, filed on Apr. 8, 2020, in the Korean Intellectual Property Office, the disclosure of which is incorporated by reference herein in its entirety.

BACKGROUND

1. Field

The disclosure relates to technology of processing secure data.

2. Description of Related Art

Electronic devices may provide various functions. For example, electronic devices may provide functions such as calling, shooting, web-browsing, or payment, etc.

If an electronic device provides a function that requires secure processing of a high level like payment, the electronic device may perform secure processing with respect to data which is received from a server (for example, a payment server) or data which is processed through an application (for example, a payment application). For example, when the electronic device receives a confirmation message for requesting a confirmation of secure information from the server, the electronic device may generate a user interface (for example, a trusted user interface (TUI)) having trust in the confirmation message through a secure world (for example, a trusted execution environment (TEE)) of a processor, and may output the user interface to a display. In addition, when a physical button directly connected to secure hardware (for example, Titan M) is selected, the electronic device may transmit a confirmation reply to the confirmation request to the server.

The above information is presented as background information only to assist with an understanding of the disclosure. No determination has been made, and no assertion is made, as to whether any of the above might be applicable as prior art with regard to the disclosure.

SUMMARY

However, since a related-art electronic device provides a user interface through a secure world of a processor, the electronic device may be vulnerable to a hardware attack. In addition, if the electronic device has no physical button directly connected to secure hardware, it may be difficult to guarantee trust in a user input.

Aspects of the disclosure are to address at least the above-mentioned problems and/or disadvantages and to provide at least the advantages described below. Accordingly, an aspect of the disclosure is to provide a method of processing secure data which outputs a user interface for secure data through a secure module physically separated from a processor, and an electronic device supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, a display, a memory including a first display driver, a processor functionally connected with the communication circuit, the display, and the memory, and a secure module which is physically separated from the processor, and includes a secure processor and a second display driver, and the secure processor is configured to: when secure data is received from an external server through the communication circuit, disable the first display driver and enable the second display driver, and output a user interface including a first object corresponding to the secure data to the display by using the enabled second display driver.

In accordance with another aspect of the disclosure, a secure data processing method of an electronic device is provided. The secure data processing method of an electronic device includes receiving secure data from an external server through a communication circuit of the electronic device, disabling a first display driver included in a memory of the electronic device, enabling a second display driver included in a secure module which is physically separated from a processor of the electronic device, and outputting a user interface including a first object corresponding to the secure data to a display of the electronic device by using the enabled second display driver.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
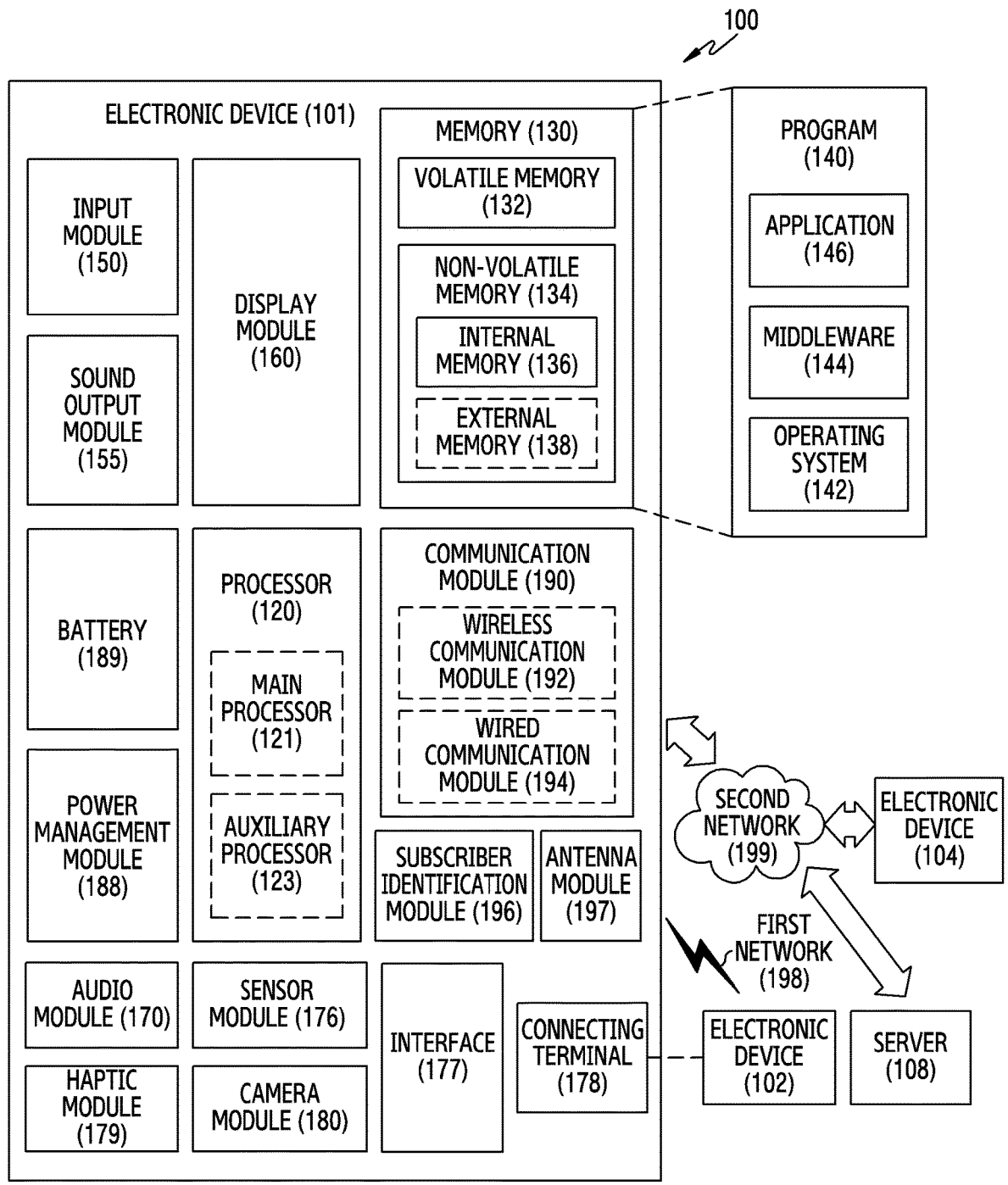
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
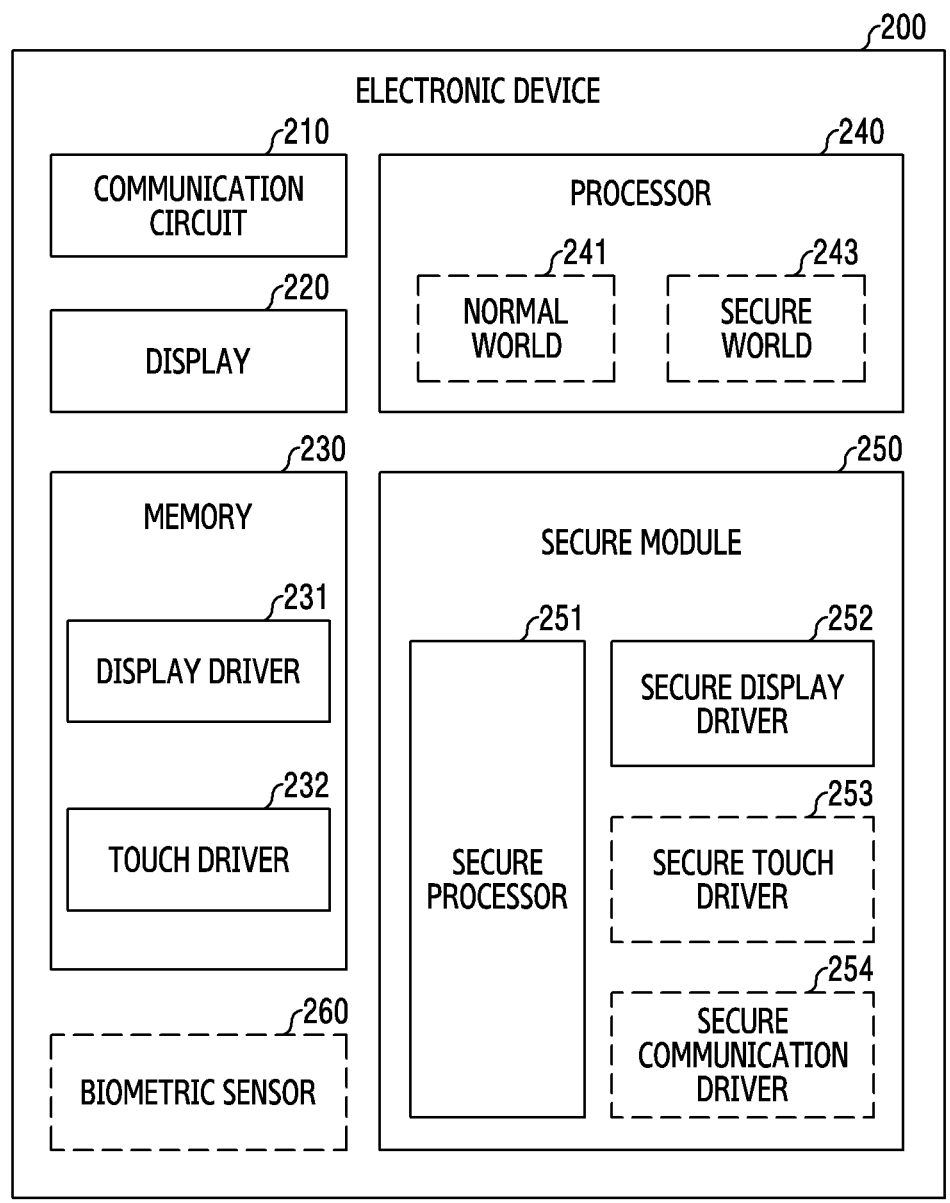
FIG. 2 is a view illustrating an electronic device related to secure data processing according to an embodiment of the disclosure.

FIG. 2 is a view illustrating an electronic device related to secure data processing according to an embodiment of the disclosure.

If the electronic device 200 (for example, the electronic device 101) provides a function that requires secure processing of a high level like payment, the electronic device 200 may perform secure processing with respect to secure data (for example, payment information) which is received from a server (for example, a payment server) or secure data which is processed through an application (for example, a payment application). For example, when the electronic device 200 receives secure data from an external server, the electronic device 200 may provide a user interface for the received secure data through a secure module 250 which is physically separated from a processor 240 and is safe from a hardware attack. Accordingly, the electronic device 200 may process a confirmation or authentication by a user regarding the secure data through the user interface having trust.

To provide the above-described function, the electronic device 200 may include a communication circuit 210 (for example, the communication module 190), a display 220 (for example, the display module 160), a memory 230 (for example, the memory 130), the processor 240 (for example, the processor 120), and the secure module 250. However, components of the electronic device 200 are not limited thereto. According to various embodiments, the electronic device 200 may omit at least one of the above-described components or may further include at least one other component. According to an embodiment, the electronic device 200 may further include a biometric sensor 260 (for example, the sensor module 176).

The communication circuit 210 may support communication between the electronic device 200 and an external electronic device. According to an embodiment, the communication circuit 210 may receive secure data from an external server and may transmit a reply message to the received secure data to the external server.

The display 220 may display various contents (for example, a text, an image, a video, an icon, or a symbol, etc.) to a user. The display 220 may include a touch screen, and for example, may receive a touch, a gesture, an approach, or a hovering input using an electronic pen or a part of user's body. According to an embodiment, the display 220 may output a user interface for secure data. The user interface may include, for example, a first object including secure information corresponding to the secure data. In addition, the user interface may include a second object which requests a confirmation or authentication by the user regarding the secure information. The first object may include, for example, a text or an image indicating the secure information. The second object may include, for example, a button object, a pattern object, or a soft input panel.

The memory 230 may store various data which are used by at least one component of the electronic device 200. According to an embodiment, the memory 230 may store an instruction and data related to processing of secure data. According to an embodiment, the memory 230 may include a display driver 231 and a touch driver 232. The display driver 231 may include an instruction and data related to operations of the display 220 (or a display panel included in the display 220). The touch driver 232 may include an instruction and data related to operations of a touch panel which is included in the display 220 or is disposed adjacent to the display 220.

The processor 240 may control at least one other component of the electronic device 200, and may perform various data processing operations or computation. The processor 240 may process normal data and may process data that requires secure processing. A security level of data processed at the processor 240 may be lower than a security level of data processed at the secure module 250. According to an embodiment, the processor 240 may include a normal world 241 (for example, a rich execution environment (REE)) for processing normal data, and a secure world 243 (for example, a trusted execution environment (TEE)) for processing data of a level that is lower than the security level of data processed at the secure module 250 but is higher than the normal security level.

According to an embodiment, the secure world 243 may include a touch driver (not shown) performing the same or similar function as or to that of the touch driver 232. For example, the touch driver installed at the secure world 243 may include an instruction and data related to operations of the touch panel. According to another embodiment, the secure world 243 may include a communication driver (for example, a serial peripheral interface (SPI) driver) (not shown) for communicating with the biometric sensor 260. The communication driver installed at the secure world 243 may include an instruction and data for communicating with the biometric sensor 260.

The secure module 250 may be hardware that is physically separated from the processor 240, and may include a secure processor 251 and a secure display driver 252. The secure display driver 252 may perform the same or similar function as or to that of the display driver 231. For example, the secure display driver 252 installed at the secure module 250 may include an instruction and data related to operations of the display 220 (or the display panel included in the display 220). According to an embodiment, the secure module 250 may further include a secure touch driver 253. The secure touch driver 253 may perform the same or similar function as or to that of the touch driver 232. For example, the secure touch driver 253 installed at the secure module 250 may include an instruction and data related to operations of the touch panel. In a certain embodiment, the secure module 250 may further include a secure communication driver 254 for communicating with the biometric sensor 260. The secure communication driver 254 installed at the secure module 250 may include an instruction and data for communicating with the biometric sensor 260.

The secure processor 251 may process secure data which requires secure processing of a high level. The secure processor 251 may output a user interface for the secure data to the display 220 by using the secure display driver 252 included in the secure module 250. Since the user interface outputted under control of the secure processor 251 is outputted by using the secure display driver 252 installed at the secure module 250 physically separated from the processor 240, the user interface may be safe from a hardware attack. Accordingly, secure data included in the user interface may have trust.

To use the secure display driver 252 included in the secure module 250, the secure processor 251 may disable the display driver 231 included in the memory 230, and may enable the secure display driver 252 included in the secure module 250. In addition, when processing of the secure data is completed, the secure processor 251 may disable the secure display driver 252 included in the secure module 250, and may enable the display driver 231 included in the memory 230 again.

In response to reception of a touch input on the user interface, the secure processor 251 may perform secure processing with respect to a reply message to the reception of the secure data. According to an embodiment, when an object (for example, a button object) for requesting a confirmation on the secure data, which is included in the user interface, is touched, the secure processor 251 may perform secure processing with respect to a reply message indicating that the secure data is confirmed. According to another embodiment, when an object (for example, a pattern object or a soft input panel) for requesting authentication of the secure data, which is included in the user interface, is touched and authentication information (for example, a PIN, a password, or a pattern) which is inputted by touch is determined to be authentication information set by the user, the secure processor 251 may perform secure processing with respect to a reply message indicating that the secure data is confirmed and authenticated. According to an embodiment, the secure processor 251 may sign the reply message by using an authentication key.

According to an embodiment, the secure processor 251 may receive a touch input generated on the user interface by using the touch driver 232 included in the memory 230. According to another embodiment, the secure processor 251 may receive a touch input generated on the user interface by using the secure touch driver 253 included in the secure module 250. According to another embodiment, the secure processor 251 may receive a touch input generated on the user interface by using the touch driver included in the secure world 243.

To use the secure touch driver 253 included in the secure module 250, the secure processor 251 may disable the touch driver 232 included in the memory 230, and may enable the secure touch driver 253 included in the secure module 250. In addition, when processing of the secure data is completed, the secure processor 251 may disable the secure touch driver 253 included in the secure module 250, and may enable the touch driver 232 included in the memory 230 again.

To use the touch driver (not shown) included in the secure world 243, the secure processor 251 may disable the touch driver 232 included in the memory 230, and may enable the touch driver included in the secure world 243. In addition, when processing of the secure data is completed, the secure processor 251 may disable the touch driver included in the secure world 243, and may enable the touch driver 232 included in the memory 230 again.

The secure processor 251 may perform secure processing with respect to the reply message to reception of the secure data, based on biometric information received from the biometric sensor 260. For example, when biometric information received from the biometric sensor 260 is determined to be biometric information of an authenticated user, the secure processor 251 may perform secure processing with respect to the reply message indicating that the secure data is confirmed and authenticated. According to an embodiment, the secure processor 251 may sign the reply message by using an authentication key. To determine whether biometric information received from the biometric sensor 260 is biometric information of an authenticated user, the secure processor 251 may compare the biometric information received from the biometric sensor 260 and biometric information of the user stored in the electronic device 200, and, when a matching rate of the biometric information is greater than or equal to a designated level, it may be determined that the biometric information received from the biometric sensor 260 is the biometric information of the authenticated user. The biometric information of the user may be stored in at least one of the memory 230, the secure world 243, or the secure module 250.

According to an embodiment, the secure processor 251 may receive the biometric information from the biometric sensor 260 by using the secure communication driver 254 included in the secure module 250. According to another embodiment, the secure processor 251 may receive the biometric information from the biometric sensor 260 by using the communication driver (not shown) included in the secure world 243. The secure communication driver 254 operating at the secure module 250 and the communication driver operating at the secure world 243 may be drivers for communicating with the biometric sensor 260, and may include, for example, an SPI driver.

To use the secure communication driver 254 included in the secure module 250, the secure processor 251 may enable the secure communication driver included in the secure module 250. In addition, when processing of the secure data is completed (or the biometric information is received), the secure processor 251 may disable the secure communication driver 254 included in the secure module 250.

To use the communication driver (not shown) included in the secure world 243, the secure processor 251 may enable the communication driver included in the secure world 243. In addition, when processing of the secure data is completed (or the biometric information is received), the secure processor 251 may disable the communication driver included in the secure world 243.

According to an embodiment, the secure processor 251 may transmit the security-processed data (for example, the reply message) to the external server through the communication circuit 210.

According to an embodiment, the secure processor 251 may generate the user interface for the secure data in a challenge method. For example, the secure processor 251 may randomly designate at least one of a content or a display position of at least one object which is included in the user interface and requests a confirmation or authentication from the user regarding the secure data. The at least one object may include, for example, a button object of random coordinates or a random equation.

Figure 3:
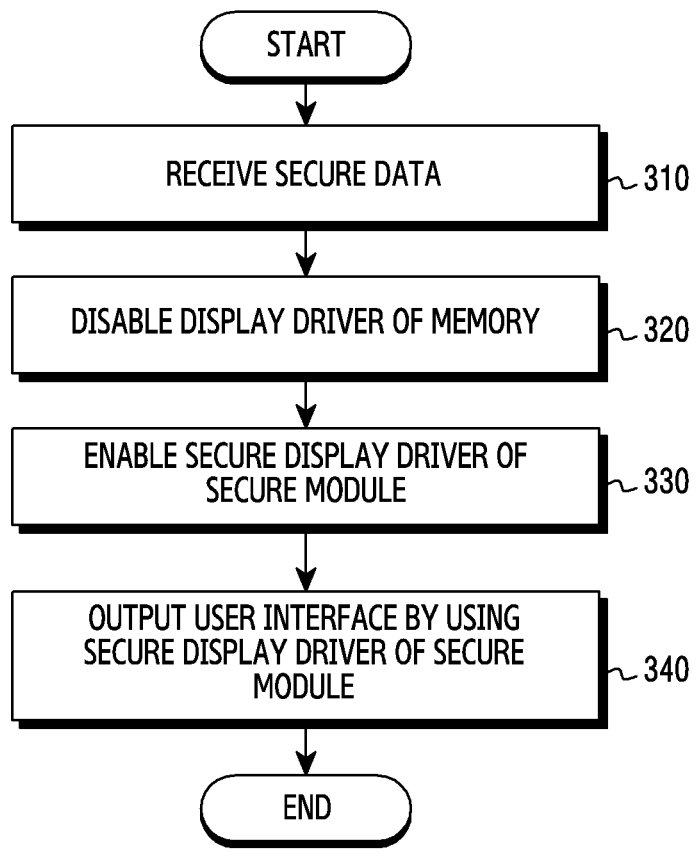
FIG. 3 is a view illustrating a secure data processing method of an electronic device according to an embodiment of the disclosure.

FIG. 3 is a view illustrating a secure data processing method of an electronic device according to an embodiment of the disclosure.

Referring to FIG. 3, in operation 310, a secure processor (for example, the secure processor 251) of the electronic device (for example, the electronic device 200) may receive secure data from an external server through a communication circuit (for example, the communication circuit 210). The secure data may include, for example, payment information which requires secure processing of a high level.

In operation 320, the secure processor may disable a display driver (for example, the display driver 231) included in a memory (for example, the memory 230). The display driver installed at the memory may include an instruction and data related to operations of a display (for example, the display 220).

In operation 330, the secure processor may enable a secure display driver (for example, the secure display driver 252) included in a secure module (for example, the secure module 250). The secure module may be secure hardware which is physically separated from a processor (for example, the processor 240), and may include the secure processor. In addition, the secure display driver installed at the secure module may perform the same or similar function as or to that of the display driver installed at the memory. For example, the secure display driver installed at the secure module may include an instruction and data related to operations of the display.

In operation 340, the secure processor may output a user interface for the secure data to the display by using the enabled secure display driver of the secure module. The user interface may include an object corresponding to the secure data. The user interface may include, for example, a first object including secure information corresponding to the secure data. In addition, the user interface may include, for example, a second object which requests a confirmation or authentication by a user regarding the secure information. The first object may include, for example, a text or an image indicating the secure information. The second object may include, for example, a button object, a pattern object, or a soft input panel.

According to an embodiment, in response to termination of the output of the user interface, the secure processor may disable the secure display driver included in the secure module, and may enable the display driver included in the memory.

Figure 4:
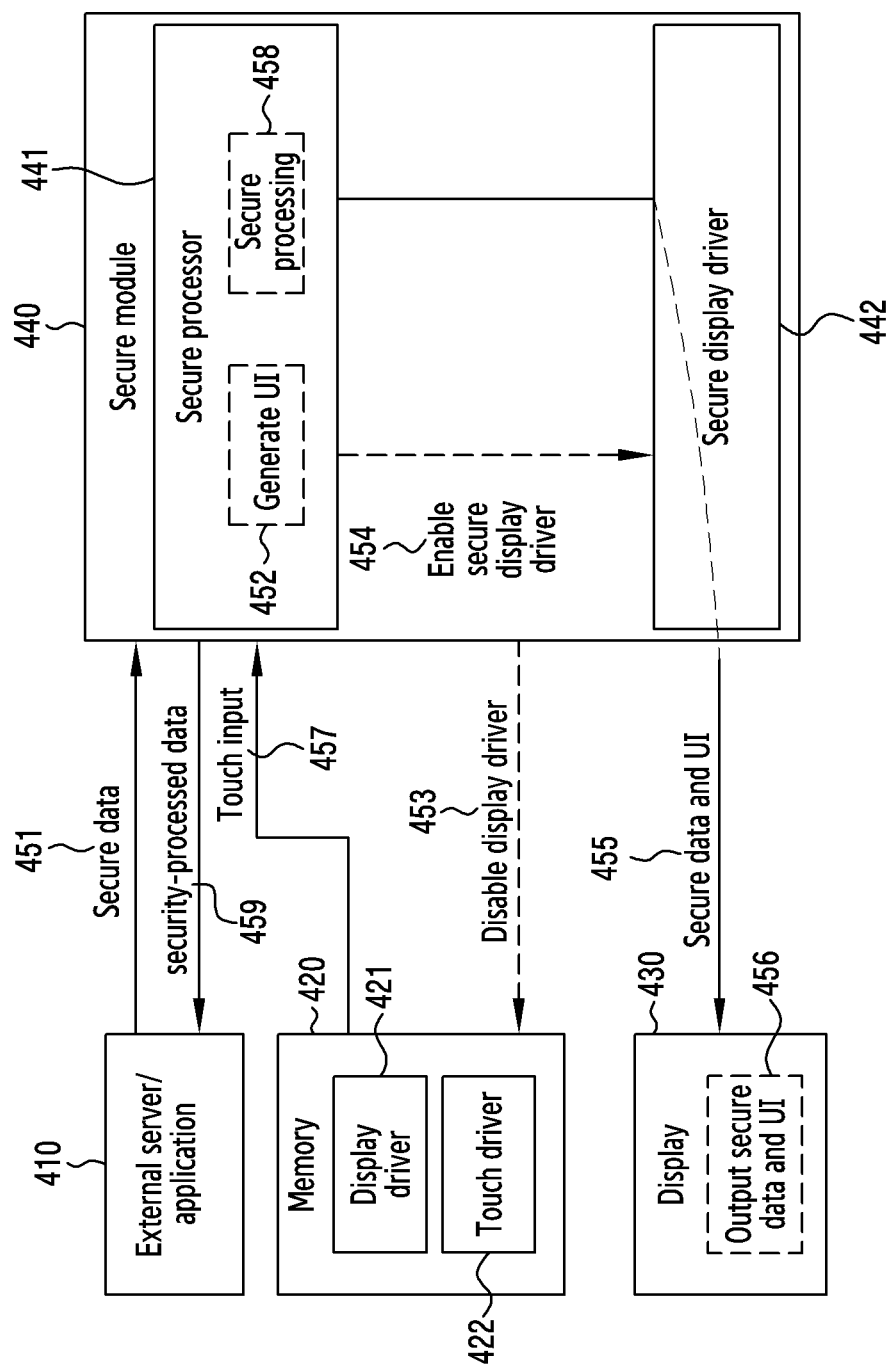
FIG. 4 is a view illustrating a first processing method for a confirmation request of secure data in an electronic device according to an embodiment of the disclosure.

FIG. 4 is a view illustrating a first processing method for a confirmation request of secure data in an electronic device according to an embodiment of the disclosure.

Referring to FIG. 4, in operation 451, an external server (or application) 410 may transmit secure data which requires a user confirmation to a secure processor 441 (for example, the secure processor 251) included in a secure module 440 (for example, the secure module 250) of the electronic device (for example, the electronic device 200). According to an embodiment, the secure data may include a nonce for preventing a replay attack, and may include a message for proving validity of the secure data, and time information. The replay attack may be an attack for accessing a system (or an electronic device) like an authorized user by duplicating the secure data and then reusing (or retransmitting) the secure data afterward, and may be defended by detecting validity of the secure data according to time or sequence of the secure data. Herein, the nonce may include a parameter which is proportional to time.

In operation 452, the secure processor 441 may generate a user interface for the secure data. The user interface may include an object which requests a confirmation by a user. According to an embodiment, the secure processor 441 may generate the user interface in a challenge method to prevent the replay attack. For example, the secure processor 441 may randomly designate at least one of a content or a display position of at least one object which is included in the user interface and requests a confirmation by the user regarding the secure data. The at least one object may include, for example, a button object of random coordinates or a random equation.

In operation 453, the secure processor 441 may disable a display driver 421 (for example, the display driver 231) included in a memory 420 (for example, the memory 230) not to operate.

In operation 454, the secure processor 441 may enable a secure display driver 442 (for example, the secure display driver 252) included in the secure module 440 to operate.

In operation 455, the secure processor 441 may transmit the secure data received from the external server (or application) 410 and the generated user interface to a display 430 (for example, the display 220).

In operation 456, the secure processor 441 may output the secure data and the user interface to the display 430 by using the secure display driver 442 included in the secure module 440. Thereafter, the user may confirm the secure data and the user interface outputted to the display 430, and may select (or touch) an object included in the user interface. For example, the user may press a button included in the user interface or may enter a reply to a question.

In operation 457, the secure processor 441 may receive a touch input generated on the user interface by using a touch driver 422 (for example, the touch driver 232) included in the memory 420.

In operation 458, when it is determined that the touch input is made by the confirmation by the user regarding the secure data, the secure processor 441 may perform secure processing with respect to the secure data. According to an embodiment, when the touch input is a touch input on the object (for example, the button object) for requesting the confirmation on the secure data, which is included in the user interface, the secure processor 441 may determine that the touch input is made by the confirmation by the user. The secure processor 441 may sign the secure data by using an authentication key (for example, a private key).

In this regard, the external server (or application) 410 may request the secure processor 441 to generate a public key for verifying a sign in advance. In addition, the secure processor 441 may generate an asymmetric key, and may store the private key therein and may transmit the public key to the external server (or application) 410.

In operation 459, the secure processor 441 may transmit the security-processed data to the external server (or application) 410. For example, the secure processor 441 may transmit the secure data which is signed with the private key to the external server (or application) 410 through a communication circuit (for example, the communication circuit 210).

When validity is confirmed by verifying the security-processed data, the external server (or application) 410 may prove that the secure data is safely confirmed by the user at the secure processor 441. For example, the external server (or application) 410 may confirm validity by verifying the secure data, which is signed with the private key, with the previously received public key.

Figure 5:
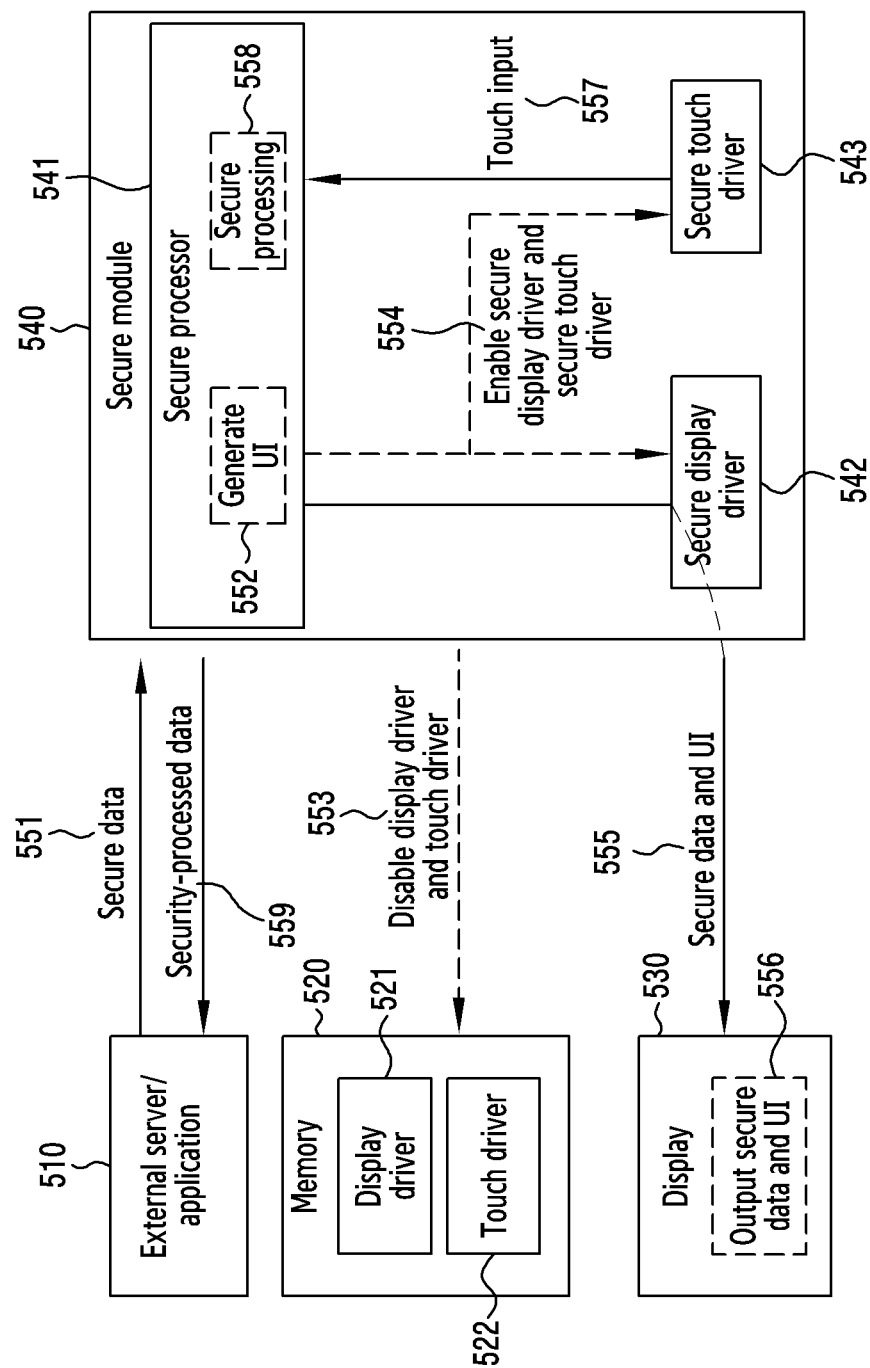
FIG. 5 is a view illustrating a second processing method for a confirmation request of secure data in an electronic device according to an embodiment of the disclosure.

FIG. 5 is a view illustrating a second processing method for a confirmation request of secure data in an electronic device according to an embodiment of the disclosure.

Referring to FIG. 5, in operation 551, an external server (or application) 510 may transmit secure data which requires a user confirmation to a secure processor 541 (for example, the secure processor 251) included in a secure module 540 (for example, the secure module 250) of the electronic device (for example, the electronic device 200). According to an embodiment, the secure data may include a nonce for preventing a replay attack, and may include a message for proving validity of the secure data, and time information.

In operation 552, the secure processor 541 may generate a user interface (UI) for the secure data. The user interface may include an object which requests a confirmation by a user. According to an embodiment, the user interface may include a button object or a question.

In operation 553, the secure processor 541 may disable a display driver 521 (for example, the display driver 231) and a touch driver 522 (for example, the touch driver 232) which are included in a memory 520 (for example, the memory 230) not to operate.

In operation 554, the secure processor 541 may enable a secure display driver 542 (for example, the secure display driver 252) and a secure touch driver 543 (for example, the secure touch driver 253) which are included in the secure module 540 to operate.

In operation 555, the secure processor 541 may transmit the secure data received from the external server (or application) 510 and the generated user interface to a display 530 (for example, the display 220).

In operation 556, the secure processor 541 may output the secure data and the user interface to the display 530 by using the secure display driver 542 included in the secure module 540. Thereafter, the user may confirm the secure data and the user interface which are outputted to the display 530, and may select (or touch) an object included in the user interface. For example, the user may press the button included in the user interface or may enter a reply to the question.

In operation 557, the secure processor 541 may receive a touch input generated on the user interface by using the secure touch driver 543 included in the secure module 540.

In operation 558, when it is determined that the touch input is made by a confirmation by the user regarding the secure data, the secure processor 541 may perform secure processing with respect to the secure data. According to an embodiment, when the touch input is a touch input on an object (for example, a button object) for requesting a confirmation on the secure data included in the user interface, the secure processor 541 may determine that the touch input is made by the confirmation by the user. The secure processor 541 may sign the secure data by using an authentication key (for example, a private key).

In this regard, the external server (or application) 510 may request the secure processor 541 to generate a public key for verifying a sign in advance. In addition, the secure processor 541 may generate an asymmetric key, and may store the private key therein and may transmit the public key to the external server (or application) 510.

In operation 559, the secure processor 541 may transmit the security-processed data to the external server (or application) 510. For example, the secure processor 541 may transmit the secure data which is signed with the private key to the external server (or application) 510 through a communication circuit (for example, the communication circuit 210).

When validity is confirmed by verifying the security-processed data, the external server (or application) 510 may prove that the secure data is safely confirmed by the user at the secure processor 541. For example, the external server (or application) 510 may confirm validity by verifying the secure data, which is signed with the private key, with the previously received public key.

Figure 6:
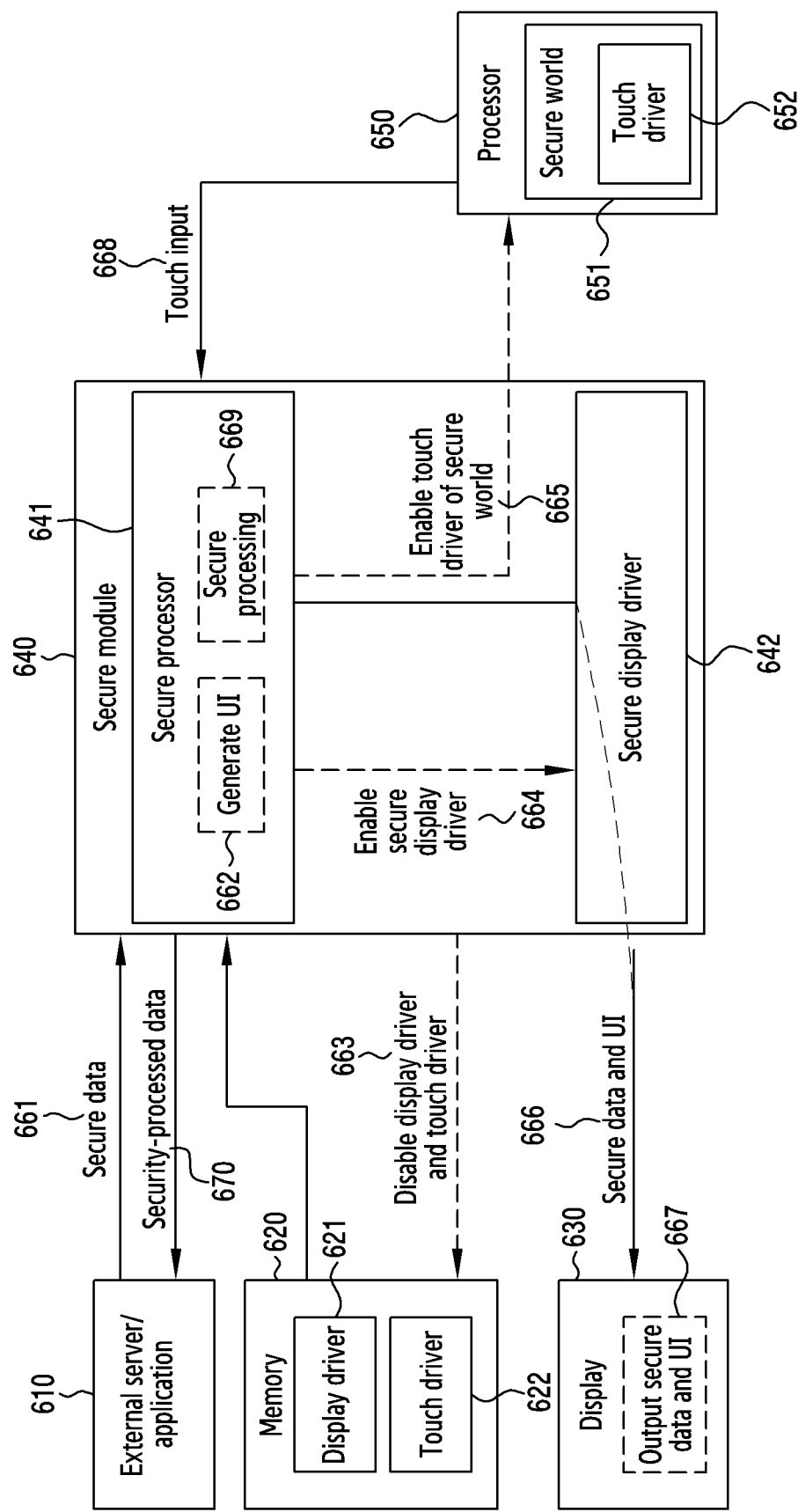
FIG. 6 is a view illustrating a third processing method for a confirmation request of secure data in an electronic device according to an embodiment of the disclosure.

FIG. 6 is a view illustrating a third processing method for a confirmation request of secure data in an electronic device according to an embodiment of the disclosure.

Referring to FIG. 6, in operation 661, an external server (or application) 610 may transmit secure data which requires a user confirmation to a secure processor 641 (for example, the secure processor 251) included in a secure module 640 (for example, the secure module 250) of the electronic device (for example, the electronic device 200). According to an embodiment, the secure data may include a nonce for preventing a replay attack, and may include a message for proving validity of the secure data, and time information. According to an embodiment, when the secure data is transmitted from the application 610 to the secure processor 641, execution of the application 610 and transmission of the secure data may be controlled by a processor 650 (for example, the processor 240).

In operation 662, the secure processor 641 may generate a user interface (UI) for the secure data. The user interface may include an object which requests a confirmation by a user. According to an embodiment, the secure processor 641 may generate the user interface in a challenge method to prevent the replay attack. For example, the secure processor 641 may randomly designate at least one of a content or a display position of at least one object which is included in the user interface and requests a confirmation by the user regarding the secure data. The at least one object may include, for example, a button object of random coordinates or a random equation.

In operation 663, the secure processor 641 may disable a display driver 621 (for example, the display driver 231) and a touch driver 622 (for example, the touch driver 232) which are included in a memory 620 (for example, the memory 230) not to operate.

In operation 664, the secure processor 641 may enable a secure display driver 642 (for example, the secure display driver 252) included in the secure module 640 to operate.

In operation 665, the secure processor 641 may enable a touch driver 652 operating in a secure world 651 (for example, the secure world 243) of the processor 650 (for example, the processor 240) to operate.

In operation 666, the secure processor 641 may transmit the secure data received from the external server (or application) 610 and the generated user interface to a display 630 (for example, the display 220).

In operation 667, the secure processor 641 may output the secure data and the user interface to the display 630 by using the secure display driver 642 included in the secure module 640. Thereafter, the user may confirm the secure data and the user interface which are outputted to the display 630, and may select (or touch) an object included in the user interface. For example, the user may press the button included in the user interface or may enter a reply to the question.

In operation 668, the secure processor 641 may receive a touch input generated on the user interface by using the touch driver 652 operating at the secure world 651.

In operation 669, when it is determined that the touch input is made by a confirmation by the user regarding the secure data, the secure processor 641 may perform secure processing with respect to the secure data. According to an embodiment, when the touch input is a touch input on an object (for example, a button object) which is included in the user interface and requests a confirmation on the secure data, the secure processor 641 may determine that the touch input is made by the confirmation by the user. The secure processor 641 ma sign the secure data by using an authentication key (for example, a private key).

In this regard, the external server (or application) 610 may request the secure processor 641 to generate a public key for verifying a sign in advance. In addition, the secure processor 641 may generate an asymmetric key, and may store the private key therein and may transmit the public key to the external server (or application) 610.

In operation 670, the secure processor 641 may transmit the security-processed data to the external server (or application) 610. For example, the secure processor 641 may transmit the secure data signed with the private key to the external server (or application) 610 through a communication circuit (for example, the communication circuit 210).

When validity is confirmed by verifying the security-processed data, the external server (or application) 610 may prove that the secure data is safely confirmed by the user at the secure processor 641. For example, the external (or application) 610 may confirm validity by verifying the secure data, which is signed with the private key, with the previously received public key.

Figure 7:
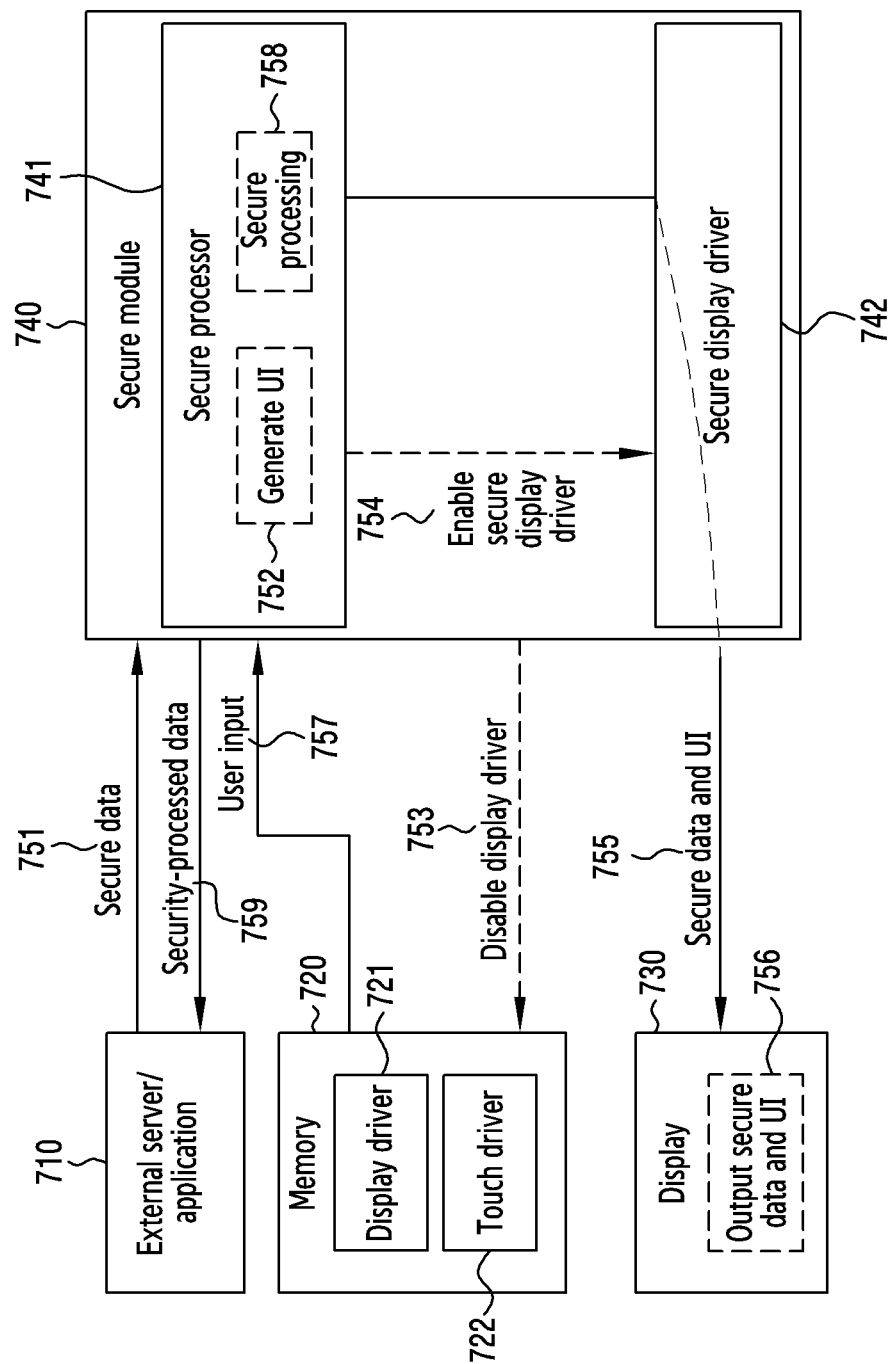
FIG. 7 is a view illustrating a first processing method for a confirmation and an authentication request of secure data in an electronic device according to an embodiment of the disclosure.

FIG. 7 is a view illustrating a first processing method for a confirmation and an authentication request of secure data in an electronic device according to an embodiment of the disclosure.

Referring to FIG. 7, in operation 751, an external server (or application) 710 may transmit secure data which requires a user confirmation to a secure processor 741 (for example, the secure processor 251) included in a secure module 740 of the electronic device (for example, the electronic device 200). According to an embodiment, the secure data may include a nonce for preventing a replay attack, and may include a message for proving validity of the secure data, and time information.

In operation 752, the secure processor 741 may generate a user interface (UI) for the secure data. The user interface may include an object which requests a confirmation and authentication by a user. According to an embodiment, the secure processor 741 may generate the user interface in a challenge method to prevent the replay attack. For example, the secure processor 741 may randomly designate at least one of a content or a display position of at least one object which is included in the user interface and requests a confirmation and authentication by the user regarding the secure data. The at least one object may be an object for entering authentication information, and may include, for example, a soft input panel for entering a PIN or a password or a pattern object for entering a pattern. Herein, display positions of respective numbers, characters, or symbols included in the soft input panel may be randomly designated, and a display position of the pattern object may be randomly designated.

In operation 753, the secure processor 741 may disable a display driver 721 (for example, the display driver 231) included in a memory 720 (for example, the memory 230) not to operate.

In operation 754, the secure processor 741 may enable a secure display driver 742 (for example, the secure display driver 252) included in the secure module 740 to operate.

In operation 755, the secure processor 741 may transmit the secure data received from the external server (or application) 710 and the generated user interface to a display 730 (for example, the display 220).

In operation 756, the secure processor 741 may output the secure data and the user interface to the display 730 by using the secure display driver 742 included in the secure module 740. Thereafter, the user may confirm the secure data and the user interface outputted to the display 730, and may select (or touch) an object included in the user interface. For example, the user may enter a PIN or a password through the soft input panel included in the user interface, or may enter a pattern through the pattern object.

In operation 757, the secure processor 741 may receive a user input (for example, a touch input) generated on the user interface by using a touch driver 722 (for example, the touch driver 232) included in the memory 720.

In operation 758, when it is determined that the touch input is made by the confirmation and authentication by the user regarding the secure data, the secure processor 741 may perform secure processing with respect to the secure data. According to an embodiment, when the entered authentication information (for example, a PIN, a password, or a pattern) and authentication information previously set by the user are compared and match each other, the secure processor 741 may determine that the touch input is made by the confirmation and authentication by the user. The secure processor 741 may sign the secure data by using an authentication key (for example, a private key).

In this regard, the external server (or application) 710 may request the secure processor 741 to generate a public key for verifying a sign in advance. In addition, the secure processor 741 may generate an asymmetric key, and may store the private key therein and may transmit the public key to the external server (or application) 710.

In operation 759, the secure processor 741 may transmit the security-processed data to the external server (or application) 710. For example, the secure processor 741 may transmit the secure data which is singed by the private key to the external server (or application) 710 through a communication circuit (for example, the communication circuit 210).

When validity is confirmed by verifying the security-processed data, the external server (or application) 710 may prove that the secure data is safely confirmed and authenticated by the user at the secure processor 741. For example, the external server (or application) 710 may confirm validity by verifying the secure data, which is signed with the private key, with the previously received public key.

Figure 8:
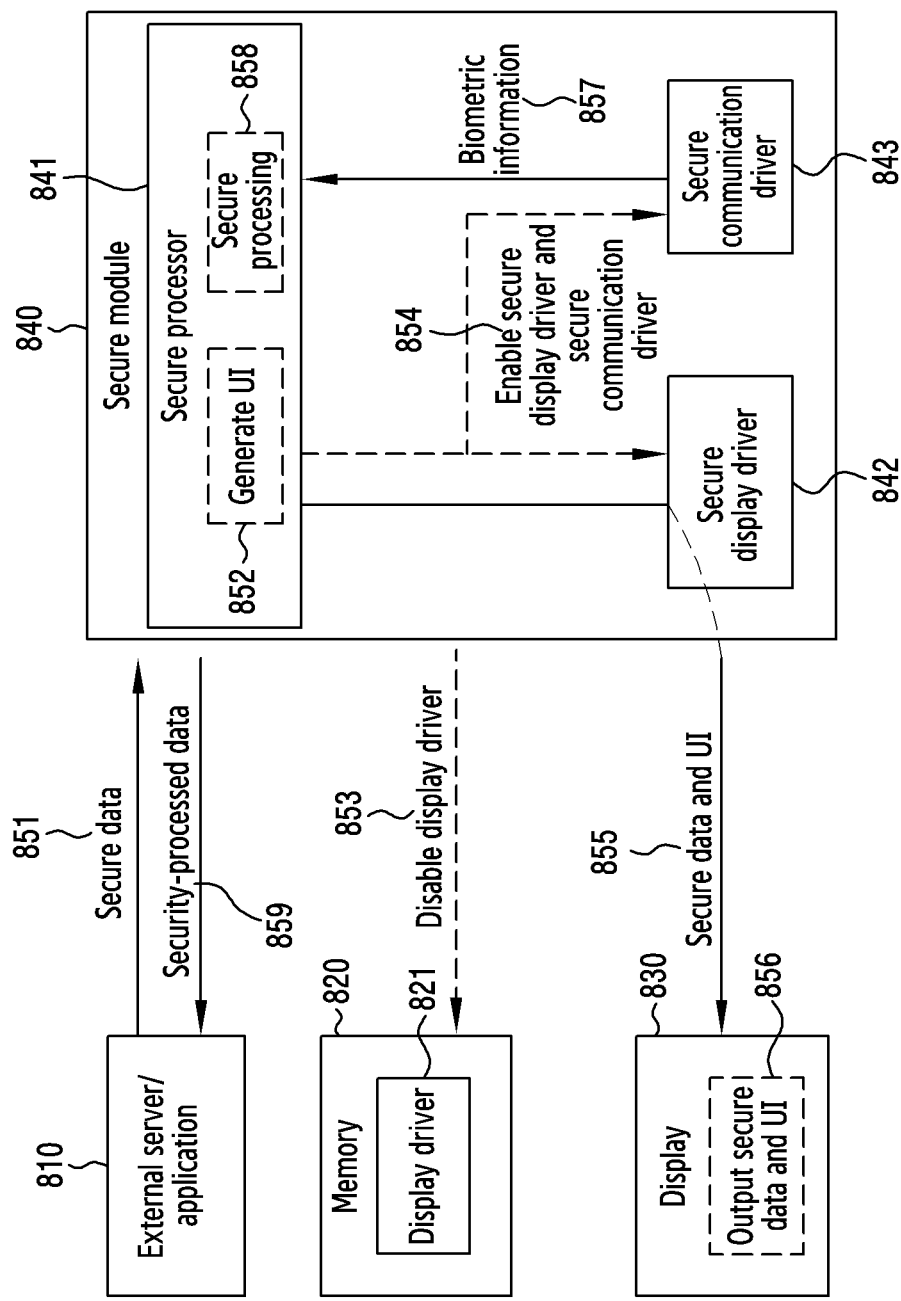
FIG. 8 is a view illustrating a second processing method for a confirmation and an authentication request of secure data in an electronic device according to an embodiment of the disclosure.

FIG. 8 is a view illustrating a second processing method for a confirmation and an authentication request of secure data in an electronic device according to an embodiment of the disclosure.

Referring to FIG. 8, in operation 851, an external server (or application) 810 may transmit secure data which requires a user confirmation to a secure processor 841 (for example, the secure processor 251) included in a secure module 840 (for example, the secure module 250) of the electronic device (for example, the electronic device 200). According to an embodiment, the secure data may include a nonce for preventing a replay attack, and may include a message for proving validity of the secure data, and time information.

In operation 852, the secure processor 841 may generate a user interface (UI) for the secure data. The user interface may include an object which requests a confirmation and authentication by a user. According to an embodiment, the user interface may include an object which requests biometric information of the user.

In operation 853, the secure processor 841 may disable a display driver 821 (for example, the display driver 231) included in a memory 820 (for example, the memory 230) not to operate.

In operation 854, the secure processor 841 may enable a secure display driver 842 (for example, the secure display driver 252) included in the secure module 840, and a secure communication driver 843 (for example, an SPI driver) for communicating with a biometric sensor (for example, the biometric sensor 260) to operate.

In operation 855, the secure processor 841 may transmit the secure data received from the external server (or application) 810 and the generated user interface to a display 830 (for example, the display 220).

In operation 856, the secure processor 841 may output the secure data and the user interface to the display 830 by using the secure display driver 842 included in the secure module 840. Thereafter, the user may confirm the secure data and the user interface outputted to the display 830, and may enter biometric information through the biometric sensor. For example, the user may have a fingerprint recognition sensor recognize a fingerprint or may have a face recognition sensor recognize a face.

In operation 857, the secure processor 841 may receive the biometric information from the biometric sensor by using the secure communication driver 843 included in the secure module 840.

In operation 858, when it is determined that the biometric information received from the biometric sensor is biometric information of an authenticated user, the secure processor 841 may perform secure processing with respect to the secure data. According to an embodiment, to determine whether the biometric information received from the biometric sensor is the biometric information of the authenticated user, the secure processor 841 may compare the biometric information received from the biometric sensor and user's biometric information stored in the electronic device, and, when a matching rate of the biometric information is greater than or equal to a designated level, the secure processor 841 may determine that the biometric information received from the biometric sensor is the biometric information of the authenticated user. The user's biometric information may be stored in at least one of the memory 820 or the secure module 840. The secure processor 841 may sign the secure data by using an authentication key (for example, a private key).

In this regard, the external server (or application) 810 may request the secure processor 841 to generate a public key for verifying a sign in advance. In addition, the secure processor 841 may generate an asymmetric key, and may store the private key therein and may transmit the public key to the external server (or application) 810.

In operation 859, the secure processor 841 may transmit the security-processed data to the external server (or application) 810. For example, the secure processor 841 may transmit the secure data which is singed with the private key to the external server (or application) 810 through a communication circuit (for example, the communication circuit 210).

When validity is confirmed by verifying the security-processed data, the external server (or application) 810 may prove that the secure data is safely confirmed and authenticated by the user at the secure processor 841. For example, the external server (or application) 810 may confirm validity by verifying the secure data, which is signed with the private key, with the previously received public key.

Figure 9:
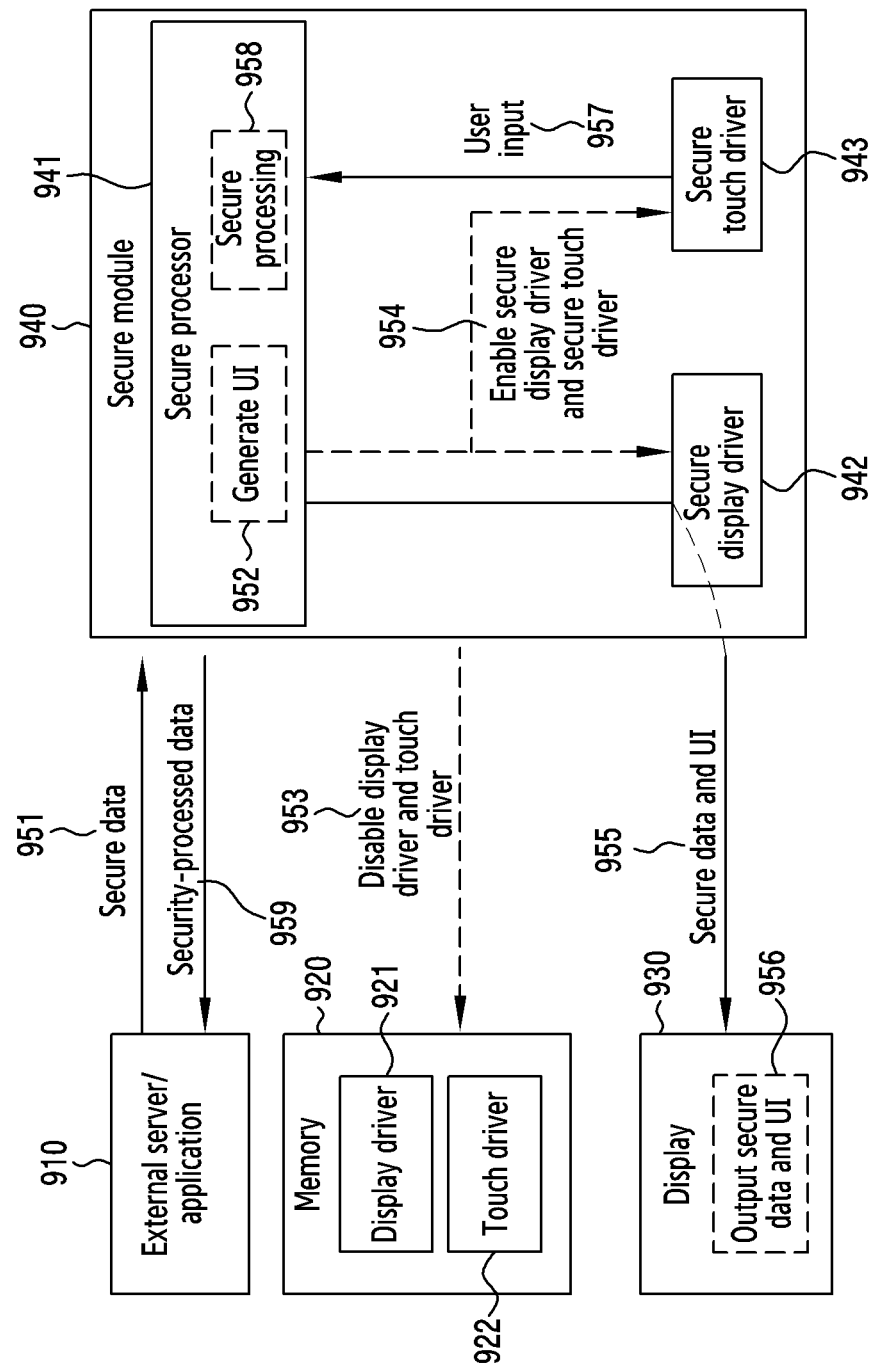
FIG. 9 is a view illustrating a third processing method for a confirmation and an authentication request of secure data in an electronic device according to an embodiment of the disclosure.

FIG. 9 is a view illustrating a third processing method for a confirmation and an authentication request of secure data in an electronic device according to an embodiment of the disclosure.

Referring to FIG. 9, in operation 951, an external server (or application) 910 may transmit secure data which requires a user confirmation to a secure processor 941 (for example, the secure processor 251) included in a secure module 940 (for example, the secure module 250) of the electronic device (for example, the electronic device 200). According to an embodiment, the secure data may include a nonce for preventing a replay attack, and may include a message for proving validity of the secure data, and time information.

In operation 952, the secure processor 941 may generate a user interface (UI) for the secure data. The user interface may include an object which requests a confirmation and authentication by a user. The user interface may include, as an object for entering authentication information, a soft input panel for entering a PIN or a password or a pattern object for entering a pattern.

In operation 953, the secure processor 941 may disable a display driver 921 (for example, the display driver 231) and a touch driver 922 (for example, the touch driver 232) which are included in a memory 920 (for example, the memory 230) not to operate.

In operation 954, the secure processor 941 may enable a secure display driver 942 (for example, the secure display driver 252) and a secure touch driver 943 (for example, the secure touch driver 253) which are included in the secure module 940 to operate.

In operation 955, the secure processor 941 may transmit the secure data received from the external server (or application) 910 and the generated UI to a display 930 (for example, the display 220).

In operation 956, the secure processor 941 may output the secure data and the user interface to the display 930 by using the secure display driver 942 included in the secure module 940. Thereafter, the user may confirm the secure data and the user interface outputted to the display 930, and may select (or touch) an object included in the user interface. For example, the user may enter a PIN or a password through the soft input panel included in the user interface, or may enter a pattern through the pattern object.

In operation 957, the secure processor 941 may receive a user input (for example, a touch input) generated on the user interface by using the secure touch driver 943 included in the secure module 940.

In operation 958, when it is determined that the touch input is made by a confirmation and authentication by the user regarding the secure data, the secure processor 941 may perform secure processing with respect to the secure data. According to an embodiment, when the entered authentication information (for example, a PIN, a password, or a pattern) and authentication information previously set by the user are compared and match each other, the secure processor 941 may determine that the touch input is made by the confirmation and authentication by the user. The secure processor 941 may sign the secure data by using an authentication key (for example, a private key).

In this regard, the external server (or application) 910 may request the secure processor 941 to generate a public key for verifying a sign in advance. In addition, the secure processor 941 may generate an asymmetric key, and may store the private key therein and may transmit the public key to the external server (or application) 910.

In operation 959, the secure processor 941 may transmit the security-processed data to the external server (or application) 910. For example, the secure processor 941 may transmit the secure data which is signed with the private key to the external server (or application) 910 through a communication circuit (for example, the communication circuit 210).

When validity is confirmed by verifying the security-processed data, the external server (or application) 910 may prove that the secure data is safely confirmed and authenticated by the user at the secure processor 941. For example, the external server (or application) 910 may confirm validity by verifying the secure data, which is signed with the private key, with the previously received public key.

Figure 10:
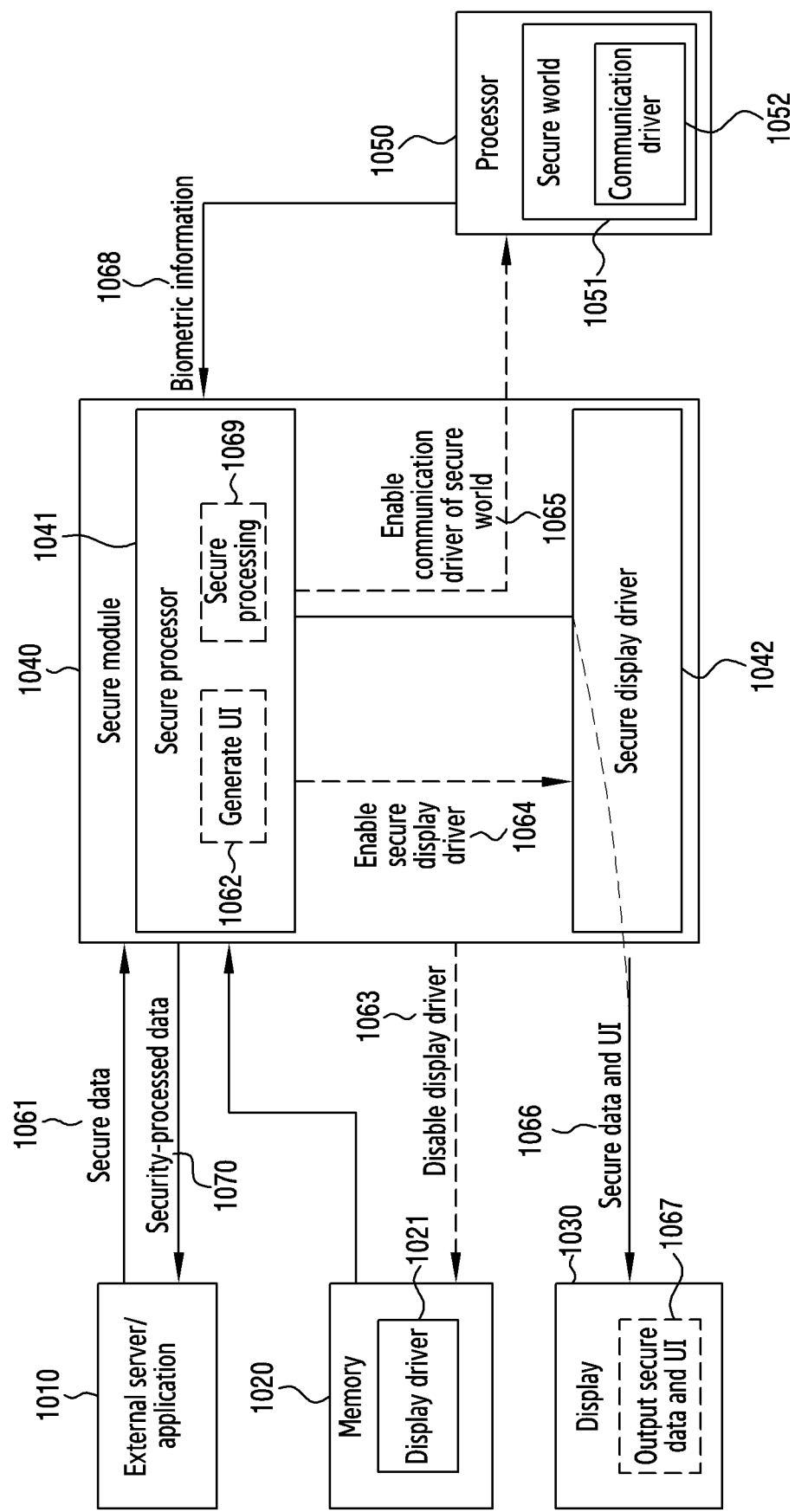
FIG. 10 is a view illustrating a fourth processing method for a confirmation and an authentication request of secure data in an electronic device according to an embodiment of the disclosure.

FIG. 10 is a view illustrating a fourth processing method for a confirmation and an authentication request of secure data in an electronic device according to an embodiment of the disclosure.

Referring to FIG. 10, in operation 1061, an external server (or application) 1010 may transmit secure data which requires a user confirmation to a secure processor 1041 (for example, the secure processor 251) included in a secure module 1040 (for example, the secure module 250) of the electronic device (for example, the electronic device 200). According to an embodiment, the secure data may include a nonce for preventing a replay attack, and may include a message for proving validity of the secure data, and time information.

In operation 1062, the secure processor 1041 may generate a user interface (UI) for the secure data. The user interface may include an object which requests a confirmation and authentication by a user. According to an embodiment, the secure processor 1041 may generate the user interface in a challenge method to prevent the replay attack. For example, the secure processor 1041 may randomly designate at least one of a content or a display position of at least one object which is included in the user interface and requests a confirmation and authentication by the user regarding the secure data. The at least one object may include, for example, an object indicating an entering area of biometric information of random coordinates.

In operation 1063, the secure processor 1041 may disable a display driver 1021 (for example, the display driver 231) included in a memory 1020 (for example, the memory 230) not to operate.

In operation 1064, the secure processor 1041 may enable a secure display driver 1042 (for example, the secure display driver 252) included in the secure module 1040 to operate.

In operation 1065, the secure processor 1041 may enable a communication driver 1052 (for example, an SPI driver) which is included in a secure world 1051 (for example, the secure world 243) of a processor 1050 (for example, the processor 240) to communicate with a biometric sensor (for example, the biometric sensor 260) to operate.

In operation 1066, the secure processor 1041 may transmit the secure data received from the external server (or application) 1010 and the generated user interface to a display 1030 (for example, the display 220).

In operation 1067, the secure processor 1041 may output the secure data and the user interface to the display 1030 by using the secure display driver 1042 included in the secure module 1040. Thereafter, the user may confirm the secure data and the user interface outputted to the display 1030, and may enter biometric information through the biometric sensor. For example, the user may have a fingerprint recognition sensor recognize a fingerprint or may have a face recognition sensor recognize a face.

In operation 1068, the secure processor 1041 may receive the biometric information from the biometric sensor by using the communication driver 1052 operating at the secure world 1051.

In operation 1069, when the biometric information received from the biometric sensor is determined to be biometric information of an authenticated user, the secure processor 1041 may perform secure processing with respect to the secure data. According to an embodiment, the secure processor 1041 may compare the biometric information received from the biometric sensor and biometric information of the user stored in the electronic device to determine whether the biometric information received from the biometric sensor is the biometric information of the authenticated user, and, when a matching rate of the biometric information is greater than or equal to a designated level, the secure processor 1041 may determine that the biometric information received from the biometric sensor is the biometric information of the authenticated user. The biometric information of the user may be stored in at least one of the memory 1020, the secure module 1040, or the secure world 1051. The secure processor 1041 may sign the secure data by using an authentication key (for example, a private key).

In this regard, the external server (or application) 1010 may request the secure processor 1041 to generate a public key for verifying a sign in advance. In addition, the secure processor 1041 may generate an asymmetric key, and may store the private key therein and may transmit the public key to the external server (or application) 1010.

In operation 1070, the secure processor 1041 may transmit the security-processed data to the external server (or application) 1010. For example, the secure processor 1041 may transmit the secure data signed with the private key to the external server (or application) 1010 through a communication circuit (for example, the communication circuit 210).

When validity is confirmed by verifying the security-processed data, the external server (or application) 1010 may prove that the secure data is safely confirmed and authenticated by the user at the secure processor 1041. For example, the external server (or application) 1010 may confirm validity by verifying the secure data, which is signed with the private key, with the previously received public key.

Figure 11:
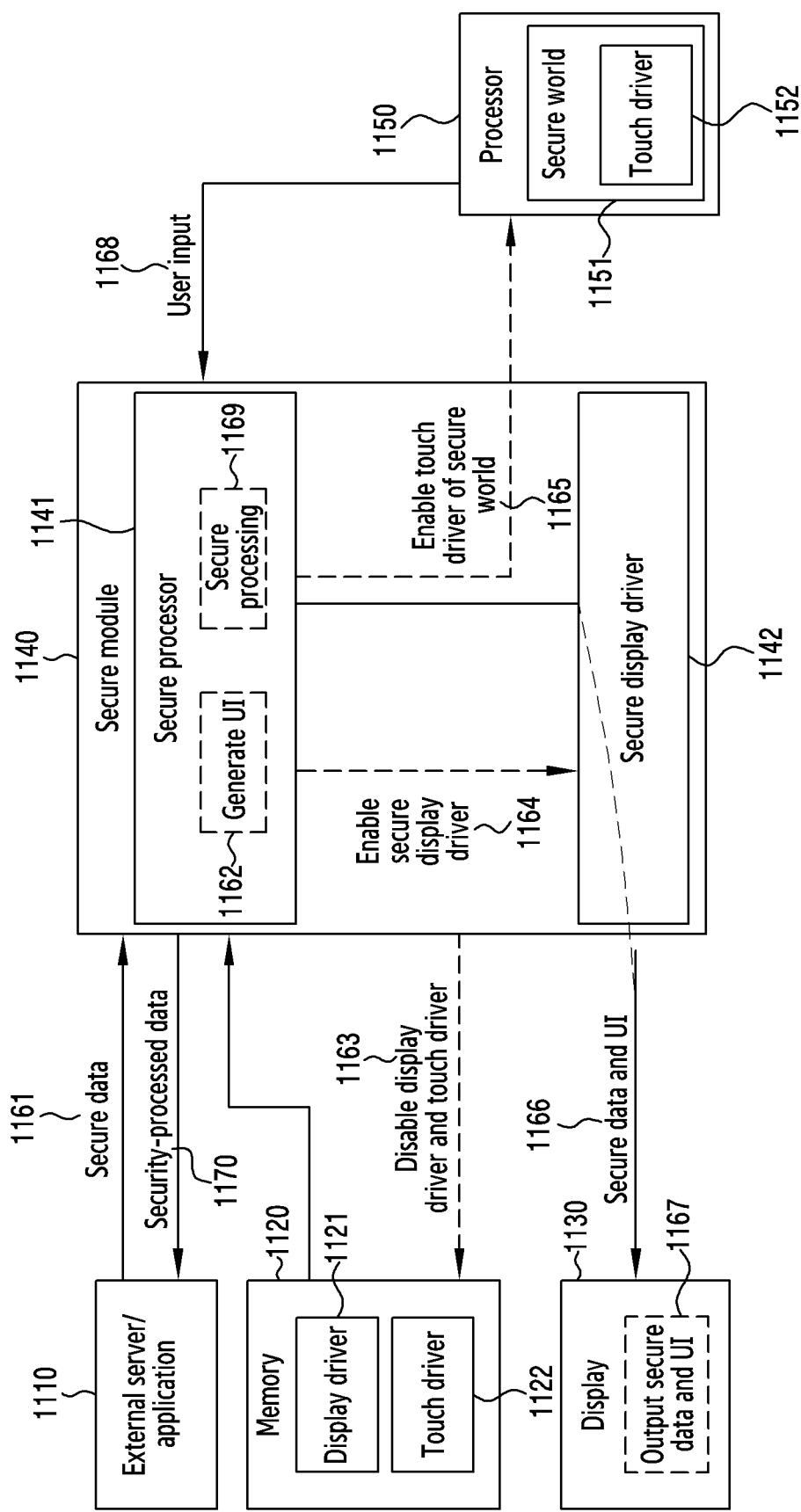
FIG. 11 is a view illustrating a fifth processing method for a confirmation and an authentication request of secure data in an electronic device according to an embodiment of the disclosure.

FIG. 11 is a view illustrating a fifth processing method for a confirmation and an authentication request of secure data in an electronic device according to an embodiment of the disclosure.

Referring to FIG. 11, in operation 1161, an external server (or application) 1110 may transmit secure data which requires a user confirmation to a secure processor 1141 (for example, the secure processor 251) included in a secure module 1140 (for example, the secure module 250) of the electronic device (for example, the electronic device 200). According to an embodiment, the secure data may include a nonce for preventing a replay attack, and may include a message for proving validity of the secure data, and time information.

In operation 1162, the secure processor 1141 may generate a user interface (UI) for the secure data. The user interface may include an object which requests a confirmation and authentication by a user. According to an embodiment, the secure processor 1141 may generate the user interface in a challenge method to prevent the replay attack. For example, the secure processor 1141 may randomly designate at least one of a content or a display position of at least one object which is included in the user interface and requests a confirmation and authentication by the user regarding the secure data. The at least one object may be an object for entering authentication information, and for example, may include a soft input panel for entering a PIN or a password or a pattern object for inputting a pattern. Herein, disposition positions of respective numbers, characters or symbols included in the soft input panel may be randomly designated, and a display position of the pattern object may be randomly designated.

In operation 1163, the secure processor 1141 may disable a display driver 1121 (for example, the display driver 231) and a touch driver 1122 (for example, the touch driver 232) which are included in a memory 1120 (for example, the memory 230) not to operate.

In operation 1164, the secure processor 1141 may enable a secure display driver 1142 (for example, the secure display driver 252) included in the secure module 1140 to operate.

In operation 1165, the secure processor 1141 may enable a touch driver 1152 operating at a secure world 1151 (for example, the secure world 243) of a processor 1150 (for example, the processor 240) to operate.

In operation 1166, the secure processor 1141 may transmit the secure data received from the external server (or application) 1110 and the generated user interface to a display 1130 (for example, the display 220).

In operation 1167, the secure processor 1141 may output the secure data and the user interface to the display 1130 by using the secure display driver 1142 included in the secure module 1140. Thereafter, the user may confirm the secure data and the user interface which are outputted to the display 1130, and may select (or touch) an object included in the user interface. For example, the user may enter a PIN or a password through the soft input panel included in the user interface, or may enter a pattern through the pattern object.

In operation 1168, the secure processor 1141 may receive a user input (for example, a touch input) generated on the user interface by using the touch driver 1152 operating at the secure world 1151.

In operation 1169, when it is determined that the touch input is made by a confirmation and authentication by the user regarding the secure data, the secure processor 1141 may perform secure processing with respect to the secure data. According to an embodiment, when the entered authentication information (for example, a PIN, a password, or a pattern) and authentication information previously set by the user are compared and match each other, the secure processor 1141 may determine that the touch input is made by the confirmation and authentication by the user. The secure processor 1141 may sign the secure data by using an authentication key (for example, a private key).

In this regard, the external server (or application) 1110 may request the secure processor 1141 to generate a public key for verifying a sign in advance. In addition, the secure processor 1141 may generate an asymmetric key, and may store the private key therein and may transmit the public key to the external server (or application) 1110.

In operation 1170, the secure processor 1141 may transmit the security-processed data to the external server (or application) 1110. For example, the secure processor 1141 may transmit the secure data which is signed with the private key to the external server (or application) 1110 through a communication circuit (for example, the communication circuit 210).

When validity is confirmed by verifying the security-processed data, the external server (or application) 1110 may prove that the secure data is safely confirmed and authenticated by the user at the secure processor 1141. For example, the external server (or application) 1110 may confirm validity by verifying the secure data, which is signed with the private key, with the previously received public key.

According to various embodiments as described above, an electronic device (for example, the electronic device 200) may include a communication circuit (for example, the communication circuit 210); a display (for example, the display 220, 430, 530, 630, 730, 830, 930, 1030, 1130); a memory (for example, the memory 230, 420, 520, 620, 720, 820, 920, 1020, 1120) including a first display driver (for example, the display driver 231, 421, 521, 621, 721, 821, 921, 1021, 1121; a processor (for example, the processor 240, 650, 1050, 1150) functionally connected with the communication circuit, the display, and the memory; and a secure module (for example, the secure module 250, 440, 540, 640, 740, 840, 940, 1040, 1140) which is physically separated from the processor, and includes a secure processor (for example, the secure processor 251, 441, 541, 641, 741, 841, 941, 1041, 1141) and a second display driver (for example, the secure display driver 252, 442, 542, 642, 742, 842, 942, 1042, 1142), and the secure processor may be configured to: when secure data is received from an external server through the communication circuit, disable the first display driver and enable the second display driver; and output a user interface including a first object corresponding to the secure data to the display by using the enabled second display driver.

According to various embodiments, the secure processor may be configured to, in response to reception of a touch input on the user interface, perform secure processing with respect to a reply message to the reception of the secure data, and to transmit the security-processed reply message to the external server through the communication circuit.

According to various embodiments, the memory may further include a first touch driver (for example, the touch driver 232, 422, 722), and the secure processor may be configured to receive the touch input generated on the user interface by using the first touch driver.

According to various embodiments, the memory may further include a first touch driver (for example, the touch driver 232, 522, 922), the secure module may further include a second touch driver (for example, the secure touch driver 253, 543, 943), and the secure processor may be configured to, when the secure data is received from the external server, disable the first touch driver and enable the second touch driver, and to receive the touch input generated on the user interface by using the enabled second touch driver.

According to various embodiments, the memory may further include a first touch driver (for example, the touch driver 232, 622, 1122), the processor may include a secure world (for example, the secure world 243, 651, 1151) and a second touch driver (for example, the touch driver 652, 1152) which operates at the secure world, and the secure processor may be configured to, when the secure data is received from the external server, disable the first touch driver and enable the second touch driver, and to receive the touch input generated on the user interface by using the enabled second touch driver.

According to various embodiments, the electronic device may further include a biometric sensor (for example, the biometric sensor 260), and the secure processor may be configured to receive biometric information from the biometric sensor, to perform secure processing with respect to a reply message to the reception of the secure data, based on the received biometric information, and to transmit the security-processed reply message to the external server through the communication circuit.

According to various embodiments, the secure module may further include a secure communication driver (for example, the secure communication driver 254, 843) for communicating with the biometric sensor, and the secure processor may be configured to, when the secure data is received from the external server, enable the secure communication driver, and to receive the biometric information from the biometric sensor by using the enabled secure communication driver.

According to various embodiments, the processor may include a secure world (for example, the secure world 243, 1051) and a communication driver (for example, the communication driver 1052) which operates at the secure world and communicates with the biometric sensor, and the secure processor may be configured to, when the secure data is received from the external server, enable the communication driver, and to receive the biometric information from the biometric sensor by using the enabled communication driver.

According to various embodiments, the secure processor may be configured to randomly designate at least one of a content or a display position of at least one second object which is included in the user interface and requests a confirmation or authentication by a user regarding the secure data.

According to various embodiments, the secure processor may be configured to, in response to termination of the output of the user interface, enable the first display driver and disable the second display driver.

According to various embodiments as described above, a secure data processing method of an electronic device (for example, the electronic device 200) may include: receiving secure data from an external server through a communication circuit of the electronic device (for example, operation 310, 451, 551, 661, 751, 851, 951, 1061, 1161); disabling a first display driver included in a memory of the electronic device (for example, operation 320, 453, 553, 663, 753, 853, 953, 1063, 1163); enabling a second display driver included in a secure module which is physically separated from a processor of the electronic device (for example, operation 330, 454, 554, 664, 754, 854, 954, 1064, 1164); and outputting a user interface including a first object corresponding to the secure data to a display of the electronic device by using the enabled second display driver (for example, operation 340, 456, 556, 667, 756, 856, 956, 1067, 1167).

According to various embodiments, the secure data processing method may further include: receiving a touch input generated on the user interface (for example, operation 457, 557, 668, 757, 957, 1168); in response to the reception of the touch input, performing secure processing with respect to a reply message to the reception of the secure data (for example, operation 458, 558, 669, 758, 958, 1169); and transmitting the security-processed reply message to the external server through the communication circuit (for example, operation 459, 559, 670, 759, 959, 1170).

According to various embodiments, receiving the touch input may include receiving the touch input generated on the user interface by using a first touch driver included in the memory (for example, operation 457, 757).

According to various embodiments, the secure data processing method may further include, when the secure data is received from the external server, disabling a first touch driver included in the memory (for example, operation 553, 953) and enabling a second touch driver included in the secure module (for example, operation 554, 954), and receiving the touch input may include receiving the touch input generated on the user interface by using the enabled second touch driver (for example, operation 557, 957).

According to various embodiments, the secure data processing method may further include, when the secure data is received from the external server, disabling a first touch driver included in the memory (for example, operation 663, 1163) and enabling a second touch driver which operates at a secure world of the processor (for example, operation 665, 1165), and receiving the touch input may include receiving the touch input generated on the user interface by using the enabled second touch driver (for example, operation 668, 1168).

According to various embodiments, the secure data processing method may further include: receiving biometric information from a biometric sensor of the electronic device (for example, operation 857, 1068); performing secure processing with respect to a reply message to the reception of the secure data, based on the received biometric information (for example, operation 858, 1069); and transmitting the security-processed reply message to the external server through the communication circuit (for example, operation 859, 1070).

According to various embodiments, the secure data processing method may further include, when the secure data is received from the external server, enabling a secure communication driver which is included in the secure module and communicates with the biometric sensor (for example, operation 854), and receiving the biometric information may include receiving the biometric information from the biometric sensor by using the enabled secure communication driver (for example, operation 857).

According to various embodiments, the secure data processing method may further include, when the secure data is received from the external server, enabling a communication driver which operates at a secure world of the processor and communicates with the biometric sensor (for example, operation 1065), and receiving the biometric information may include receiving the biometric information from the biometric sensor by using the enabled communication driver (for example, operation 1068).

According to various embodiments, outputting the user interface may include randomly designating at least one of a content or a display position of at least one second object which is included in the user interface and requests a confirmation or authentication by a user regarding the secure data.

According to various embodiments, the secure data processing method may further include, in response to termination of the output of the user interface, enabling the first display driver and disabling the second display driver.

Figure 12:
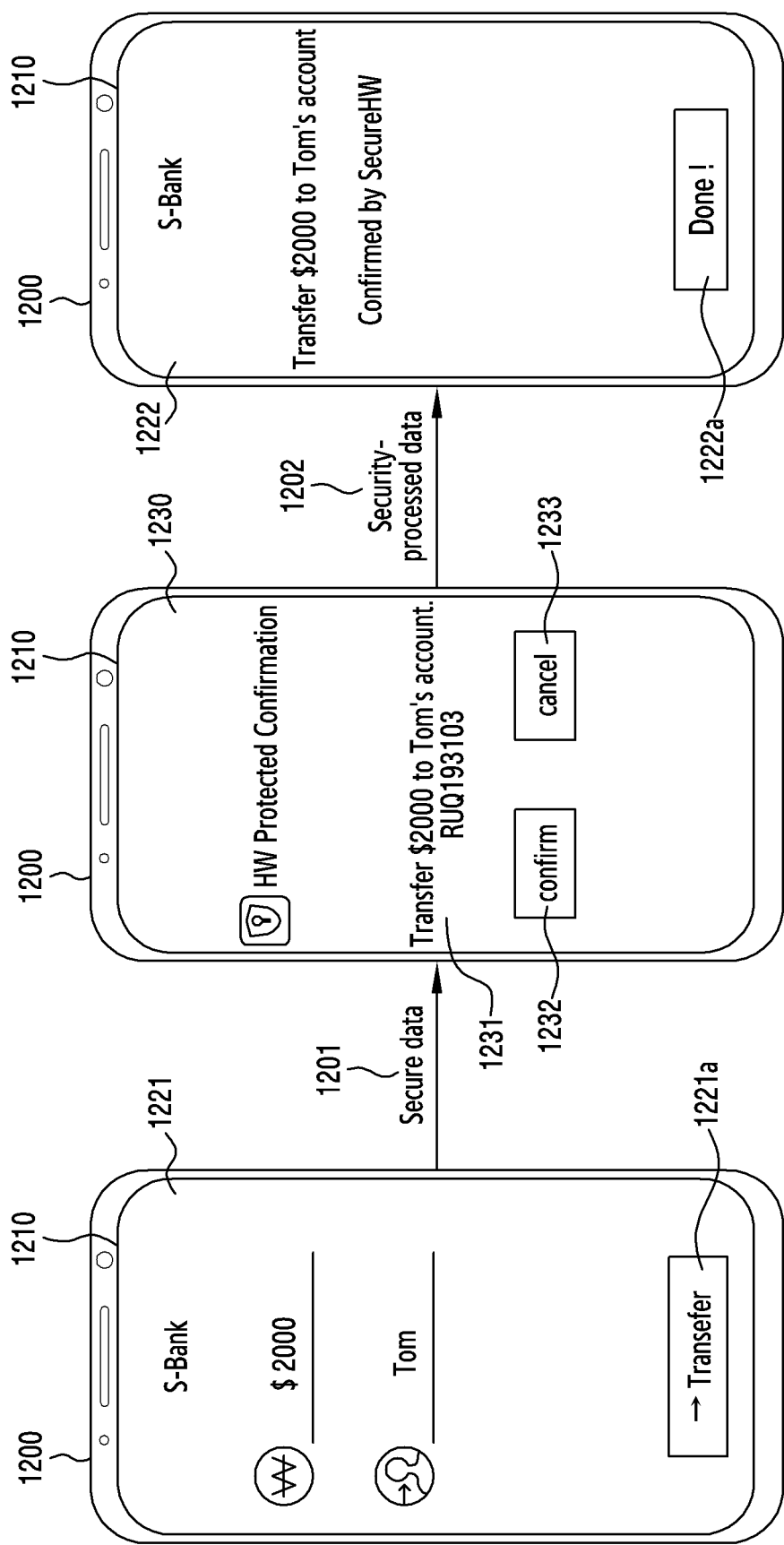
FIG. 12 is a view illustrating a user interface for secure data of an electronic device according to an embodiment of the disclosure.

FIG. 12 is a view illustrating a user interface for secure data of an electronic device according to an embodiment of the disclosure.

Referring to FIG. 12, a processor (for example, the processor 240) of the electronic device 1200 (for example, the electronic device 200) may output a first execution screen 1221 of an application to a display 1210 (for example, the display 220). The application may include, for example, an account management application (for example, a bank application (S-bank)), and the first execution screen 1221 may include information regarding an amount to be transferred (for example, $2000) and a beneficiary name (for example, Tom). In addition, the first execution screen 1221 may include a button object 1221*a* to transmit secure data, like the information on the amount to be transferred and the beneficiary name, to a secure module (for example, the secure module 250).

When the button object 1221*a* is selected, the processor (or the application) may transmit the secure data (for example, the information on the amount to be transferred and the beneficiary name) to a secure processor (for example, the secure processor 251) of the secure module in operation 1201.

The secure processor may output a user interface 1230 for the received secure data to the display 1210 by using a secure display driver (for example, the secure display driver 252) included in the secure module. For example, when the secure data is received, the secure processor may disable a display driver (for example, the display driver 231) included in a memory (for example, the memory 230), and may enable the secure display driver included in the secure module. In addition, the secure processor may output the user interface 1230 to the display 1210 by using the enabled secure display driver.

The user interface 1230 may include an object 1231 (for example, a text) including secure information corresponding to the secure data, an object 1232 (for example, a button) for requesting a confirmation by a user regarding the secure information, and an object 1233 (for example, a button) for canceling the confirmation.

When the object 1233 for canceling the confirmation is selected, the secure processor may terminate the output of the user interface 1230. In this case, the secure processor may disable the secure display driver included in the secure module, and may enable the display driver included in the memory.

When the object 1232 for requesting a confirmation by the user is selected, the secure processor may perform secure processing with respect to the secure data, and may transmit the security-processed data to the processor (or the application) in operation 1202. For example, the secure processor may sign the secure data by using an authentication key, and may transmit the signed secure data to the processor (or the application).

The secure processor may terminate the output of the user interface 1230 while transmitting the security-processed data to the processor (or the application), and may disable the secure display driver included in the secure module and may enable the display driver included in the memory.

When the processor (or the application) receives the security-processed data, the processor may output a second execution screen 1222 of the application to the display 1210. The second execution screen 1222 may include an object (for example, a text) indicating that the information on the amount to be transferred and the beneficiary name is confirmed by the user. In addition, the second execution screen 1222 may include a button object 1222*a* for requesting completion of the account transfer.

According to various embodiments of the disclosure, a user interface for secure data is outputted through a secure module physically separated from a processor, so that security regarding processing of secure data can be enhanced.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit;
a display;
a memory comprising a first display driver;
a processor functionally connected with the communication circuit, the display, and the memory; and
a secure module which is physically separated from the processor, and comprises a secure processor and a second display driver,
wherein the secure processor is configured to:
when secure data is received from an external server through the communication circuit, disable the first display driver and enable the second display driver; and
output a user interface comprising a first object corresponding to the secure data to the display by using the enabled second display driver.

2. The electronic device of claim 1, wherein the secure processor is further configured to:
in response to reception of a touch input on the user interface, perform secure processing with respect to a reply message to the reception of the secure data, and
transmit the security-processed reply message to the external server through the communication circuit.

3. The electronic device of claim 2,
wherein the memory further comprises a first touch driver, and
wherein the secure processor is configured to receive the touch input generated on the user interface by using the first touch driver.

4. The electronic device of claim 2,
wherein the memory further comprises a first touch driver,
wherein the secure module further comprises a second touch driver, and
wherein the secure processor is further configured to:
when the secure data is received from the external server, disable the first touch driver and enable the second touch driver, and
receive the touch input generated on the user interface by using the enabled second touch driver.

5. The electronic device of claim 2,
wherein the memory further comprises a first touch driver,
wherein the processor comprises a secure world and a second touch driver which operates at the secure world, and
wherein the secure processor is configured to, when the secure data is received from the external server, disable the first touch driver and enable the second touch driver, and to receive the touch input generated on the user interface by using the enabled second touch driver.

6. The electronic device of claim 1, further comprising:
a biometric sensor, wherein the secure processor is further configured to:
  receive biometric information from the biometric sensor,
  perform secure processing with respect to a reply message to the reception of the secure data, based on the received biometric information, and
  transmit the security-processed reply message to the external server through the communication circuit.

7. The electronic device of claim 6,
wherein the secure module further comprises a secure communication driver for communicating with the biometric sensor, and
wherein the secure processor is further configured to:
  when the secure data is received from the external server, enable the secure communication driver, and
  receive the biometric information from the biometric sensor by using the enabled secure communication driver.

8. The electronic device of claim 6,
wherein the processor comprises a secure world and a communication driver which operates at the secure world and communicates with the biometric sensor, and
wherein the secure processor is configured to, when the secure data is received from the external server, enable the communication driver, and to receive the biometric information from the biometric sensor by using the enabled communication driver.

9. The electronic device of claim 1, wherein the secure processor is further configured to:
  randomly designate at least one of a content or a display position of at least one second object, which is included in the user interface, and
  request a confirmation or authentication regarding the secure data.

10. The electronic device of claim 1, wherein the secure processor is further configured to, in response to termination of the output of the user interface, enable the first display driver and disable the second display driver.

11. A secure data processing method of an electronic device, the method comprising:
  disabling a first display driver included in a memory of the electronic device based on receiving secure data from an external server through a communication circuit of the electronic device;
  enabling a second display driver included in a secure module which is physically separated from a processor of the electronic device; and
  outputting a user interface comprising a first object corresponding to the secure data to a display of the electronic device by using the enabled second display driver.

12. The method of claim 11, further comprising:
  receiving a touch input generated on the user interface;
  in response to the reception of the touch input, performing secure processing with respect to a reply message to the reception of the secure data; and
  transmitting the security-processed reply message to the external server through the communication circuit.

13. The method of claim 12, wherein the receiving of the touch input comprises receiving the touch input generated on the user interface by using a first touch driver included in the memory.

14. The method of claim 12, further comprising:
  when the secure data is received from the external server, disabling a first touch driver included in the memory and enabling a second touch driver included in the secure module or a second touch driver which operates at a secure world of the processor,
  wherein receiving the touch input comprises receiving the touch input generated on the user interface by using the enabled second touch driver.

15. The method of claim 11, further comprising:
  receiving biometric information from a biometric sensor of the electronic device;
  performing secure processing with respect to a reply message to the reception of the secure data, based on the received biometric information; and
  transmitting the security-processed reply message to the external server through the communication circuit.

16. The method of claim 11, wherein the outputting of the user interface comprises:
  randomly designating at least one of a content or a display position of at least one second object, which is included in the user interface, and
  requesting a confirmation or authentication regarding the secure data.

17. The method of claim 11, further comprising:
  in response to termination of the output of the user interface, enabling the first display driver and disabling the second display driver.

18. The method of claim 11, further comprising:
  generating a user interface for the secure data received from the external server.

19. The method of claim 18, wherein the user interface includes at least one object for requesting a confirmation for the secure data.

20. The method of claim 19, wherein at least one of a content or a display position of the at least one object for requesting the confirmation for the secure data is randomly designated in order to prevent a replay attack.

* * * * *